United States Patent Office 3,038,863
Patented June 12, 1962

3,038,863
POLYMERIZATION CATALYST
Joseph Hendrickson Balthis, Jr., Mendenhall, Pa., and William Franklin Gresham, and Nicholas George Merckling, Wilmington, Del., assignors to E. I. du Pont de Nemours and Company, Wilmington, Del., a corporation of Delaware
No Drawing. Filed May 15, 1956, Ser. No. 584,888
7 Claims. (Cl. 252—431)

This invention relates to novel catalyst systems, and more particularly to catalyst systems useful in the polymerization of ethylene to solid polymers employing molybdenum coordination complexes and to the process of polymerizing ethylene using novel molybdenum catalyst systems.

Heretofore, it has been widely known that ethylene can be converted to solid polymers under very high pressure in the presence of catalysts which are capable of yielding free radicals under polymerization conditions.

It has also been known heretofore (U.S. Patents 2,212,155, 2,475,520, 2,467,234) that certain metal alkyls and Grignard Reagents are capable of initiating the conversion of ethylene to solid polymers through a free radical mechanism at high pressures. Ethylene has also been converted to solid polymers in the presence of hydrogenation catalysts promoted with alkali metals or alkali metal hydrides (British Patent 536,102).

Generally speaking, Friedel-Crafts type catalysts have not been effective for converting ethylene to solid polymers but instead have resulted in the formation of liquid polymers from ethylene, however, it has recently been reported that solid polymers admixed with oils can be obtained by polymerizing ethylene in the presence of aluminum chloride and titanium chloride at elevated temperatures and high pressures and advantageously in the presence of HCl-binding metals like aluminum powder (Fischer, German Patent 874,215 Ausgegeben April 20, 1953).

Redox systems have frequently been disclosed for polymerization of olefinic compounds. In the past, redox systems have resulted in the formation of highly-branched low density polymers, except at extremely high pressures, at which high density ethylene polymers have been obtained heretofore. In many of these systems a heavy metal compound was employed in combination with a reducing component (cf. U.S. Patents 2,380,473 and 2,383,425). While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been discovered, in accordance with the present invention, that extraordinary and highly useful effects are produced by reducing a compound of molybdenum, in the manner hereinafter described, and bringing the resulting mixture into contact with a compound containing ethylenic unsaturation, especially alpha olefin hydrocarbons.

In specific embodiments it has been found that molybdenum compounds containing molybdenum combined with radicals (suitable examples being alkoxy radicals, alkyl radicals and radicals which form acids when combined with hydrogen) can be used effectively in the formation of the catalyst.

The reduction step is generally performed by admixing a molybdenum compound with a strong reducing agent, such as compounds having at least one metal-to-hydro-carbon bond or compounds having at least one metal-to-hydrogen bond. It is known that such agents will reduce the valence state of the molybdenum to a lower state. It is possible that active complexes of molybdenum, which are effective in the polymerization of ethylenically-unsaturated compounds, as disclosed herein, are formed by reaction of the molybdenum in a low state of valence with the said reducing agent. In particular embodiments a sufficient quantity of the reducing agent is added to the molybdenum compound to achieve not only the reduction of the molybdenum but, in addition, to achieve the formation of the active complex. This active molybdenum complex is believed to contain molybdenum in certain electron distribution states which give the complex a catalytic activity made use of in this invention. Coordination of the reactive complex with organic components does not necessarily destroy its ability as a catalyst; in fact, it appears that ethylene is capable of coordinating with the active molybdenum complex in this manner, and quite possibly this phenomenon has a bearing on the mechanism of the polymerization.

The reducing components which can be used for production of these coordination catalysts include the following: (1) Grignard Reagents, (2) metal alkyls or aryls and similar organometallic compounds, (3) zinc metal and metals above zinc in the electromotive series and (4) metal hydrides.

The nature of these coordination complexes is not fully understood, but they are evidently active catalysts or catalyst components which are capable of initiating the polymerization of ethylene in an extremely active manner to produce solid ethylene polymers. The density of the polymers obtained through the use of these coordination complexes generally exceeds, at least to some extent, the density of polyethylene prepared by the use of free radical types of catalysts, except those free radical polymerization processes which employ such extremely high pressures as to produce abnormally high density polyethylene as compared with polyethylene made at moderately high pressure (700–1200 atmospheres) by a free radical polymerization process (cf. U.S. Patent 2,586,322).

It is believed that the coordination complexes hereinabove described are novel compounds which have not been employed heretofore in the polymerization of ethylene. The complexes are difficult to isolate in the pure state, but their presence can be indicated from the chemical properties of the mixture produced when a molybdenum compound is admixed with sufficient quantities of a reducing agent, such as the evolution of hydrogen which results on reacting the complex with water. A good visual test for the formation of the active complex is the formation of a dark precipitate, found to be catalytically active, on combining the two catalyst components. This test is particularly striking when the catalyst components are admixed in the form of solutions in hydrocarbon solvents.

While the polymerization of ethylene to produce solid polymers in the presence of catalysts disclosed herein can be carried out under mild conditions, it is preferable, from an economic standpoint, to employ moderately high pressures, suitably from 1 to 200 atmospheres or higher, in order to facilitate the handling of ethylene. Much higher pressures, up to several thousand atmospheres, can be employed, but it is not desirable to do this is view of the extraordinary activity of the catalysts at lower pressures. Similarly, extremely low temperatures may be employed. The preferred temperatures are within the range of about 0–300° C.

Similar reaction conditions are employed in the polymerization or interpolymerization of other alpha olefins in the practice of this invention.

The polymerization of ethylene, according to the process of this invention, takes place most satisfactorily when the polymerization mixture is substantially moisture-free and also free of other sources of hydroxyl groups. Carbon dioxide should also be substantially excluded. As in numerous other ethylene polymerization processes, the polymerization mixture in the process of this invention is preferably kept free of oxygen, since oxygen reacts with the catalyst. In practical operations, the oxygen content should preferably be held below 20 parts per million. Certain compounds which are capable of coordinating with the activated molybdenum form coordination complexes which are too stable for optimum results, and, accordingly, the presence of these compounds should preferably (although not necessarily) be avoided. In this category are ketones and esters. Hydrocarbon solvent or a liquid olefin to be polymerized, on the other hand, can be used quite effectively as reaction media.

The preferred molybdenum compounds employed in the process of the present invention are molybdenum halides and molybdenum compounds in which molybdenum is combined with organic radicals. Particularly useful are those molybdenum compounds which are soluble in hydrocarbon solvents, since the reduction of the molybdenum compound to the catalytically active complex is facilitated if the molybdenum compound is soluble.

The preferred reducing agents which are effective for forming the active molybdenum catalyst are compounds having at least one metal-to-hydrocarbon bond. In this class may be mentioned Grignard reagents, metal alkyls or aryls or similar organometallic compounds. Compounds having two or more metal atoms directly attached to hydrocarbon are included, e.g. BrMg(alkylene)MgBr. An especially preferred class of reducing agents comprises hydrocarbon-soluble compounds, such as $Sn(alkyl)_4$ or compounds of the formula $LiAl(alkyl)_4$, where the alkyl groups have about 4 to 18 carbon atoms.

The novel catalysts described herein are preferably used in dissolved or colloidally dispersed form. Hydrocarbon solvents are preferably used as the dispersion medium and as the solvent for the catalyst. The active molybdenum complex may be prepared in a separate and prior step. In the latter case, it is advisable to keep the active molybdenum complex at around 0° C. and free from water and air contamination so as to avoid the decomposition of the complex.

The invention is illustrated further by means of the following examples.

*Example I*

Molybdenum pentachloride (.01 mole) was dispersed in 100 cc of cyclohexane, and .02 mole of tetrabutyl tin was added. The resulting deeply-colored solution was introduced into a 325 ml. shaker tube, evacuated, flushed with nitrogen and re-evacuated. The shaker tube was then heated to 75° C. and pressured to 1000 p.s.i. with ethylene and agitated for 30 minutes. Thereupon, the temperature was increased to 140° and agitation continued for another 30 minutes. The resulting polymer was filtered from the reaction mixture and washed with a methanol and hydrochloric acid mixture, a methanol and aqueous sodium hydroxide mixture, and finally with acetone. The dry polymer produced weighed 23 grams and exhibited a density of 0.96. A tough film of this polymer could be compression molded at 190° C.

*Example II*

To 100 cc. of cyclohexane was added (with agitation) 2.7 grams of molybdenum pentachloride (0.01 mole) under a blanket of nitrogen. The resulting mixture was placed in an ice bath and 0.05 mole of phenylmagnesium bromide was added slowly to the cooled reaction mixture with continuous agitation, keeping the temperature below 20° C. Upon complete addition, the mixture was stirred for an additional 30 minutes. The reaction product was charged into a 325 ml. shaker tube under a blanket of nitrogen. The shaker tube was flushed, evacuated, heated to 100° C. and pressured to 2550 p.s.i. with ethylene. Upon agitating for 3 hours, the reaction mixture was removed from the shaker tube and the resulting polymer filtered and washed as described in Example I. The resulting dry polymer was found to have a density of 0.96 and could be compression molded into tough films.

*Example III*

To a solution of 0.01 mole of lithium aluminum tetra-cyclohexenylethyl in 100 ml. of benzene was added under a blanket of nitrogen 0.005 mole of molybdenum pentachloride. This reaction mixture was charged under a blanket of nitrogen to a stainless steel shaker tube having an approximate capacity of 325 ml. The nitrogen was replaced with ethylene and the reaction mixture was heated to 150° C. The reaction vessel was then pressured with additional ethylene until a pressure of 1000 p.s.i. was obtained. The reaction mixture was agitated for a period of 30 minutes while temperature and pressure were maintained. The reaction mixture was then cooled to room temperature and excess monomer was removed. The resulting polymer was filtered from the reaction medium and washed as described in Example I. The dry polymer weighed 11 grams. The polymer was of extremely high molecular weight and exhibited little or no melt flow. A tough film of the polymer could be obtained by compression molding at 190° C.

*Example IV*

To a solution of 0.008 mole of diethyl aluminum bromide in 50 ml. of cyclohexane was charged under a blanket of nitrogen 0.001 mole of molybdenum pentachloride. The reaction mixture was preheated under nitrogen for 15 minutes at 150° C. The resulting product was charged into a stainless steel shaker tube having an approximate capacity of 325 ml. under a blanket of nitrogen. Ethylene was polymerized, employing a pressure of 1000 p.s.i. and a temperature of 100° C. for a period of 1 hour, according to the procedure described in Example III. On washing and drying, a solid polyethylene weighing 2.5 grams was obtained. The polymer could be molded into tough films by heating the polymer under pressure to temperatures of 190° C.

*Example V*

To a solution of 0.01 mole of lithium aluminum hydride in 100 ml. of benzene was added under a blanket of nitrogen 0.005 mole of molybdenum pentachloride. The resulting mixture was employed in the polymerization of ethylene according to the procedure described in Example III, employing an ethylene pressure of 500 p.s.i. and a temperature which was gradually increased from 50 to 170° C. for a period of 90 minutes. On washing and drying, 3.5 grams of a solid polymer was obtained. The polymer was found to have a melt index of 2.3 as measured by ASTM–1238–52T. Tough films could be obtained by compression molding the polymer at 190° C.

*Example VI*

To a solution of 0.003 mole of molybdenum penta-ethoxide in 100 ml. of xylene was added 0.01 mole of phenyl magnesium bromide. The resulting mixture was employed in the polymerization as described in Example III. The polymerization was carried out for 2.5 hours, during which time the temperature varied from 50 to 150° C. The ethylene pressure was maintained at 2200 p.s.i. during the polymerization. On washing and drying, 3.6 grams of solid polyethylene was obtained. The polymer was compression molded into tough films by heating to 190° C. under pressure.

Example VII

Into a stainless steel shaker tube having a capacity of approximately 325 ml. was charged under a blanket of nitrogen 200 ml. of toluene, 4.5 grams of molybdenum pentaacetylacetonate and 2.0 grams of calcium hydride. To prevent catalyst agglomeration, 40 small stainless steel bearings were added to the reaction vessel. The nitrogen was removed and replaced with ethylene. Polymerization was carried out at an ethylene pressure of 1000 p.s.i., and at a temperature of 250° C. for a period of 4 hours under continuous agitation. On cooling and removal of excess ethylene, a small quantity of solid polyethylene was obtained, the infrared spectrum of which indicated less than 0.2 methyl groups per 100 carbon atoms in the polymer chain.

Example VIII

Example VII was repeated employing 5.0 grams of crushed molybdenum carbonyl, along with the calcium hydride reducing component. A small amount of solid polyethylene weighing 51 mg. was isolated.

Example IX

To a solution of 0.025 mole of phenyl magnesium bromide in 100 ml. of toluene cooled to −50° C. was added under a blanket of nitrogen 0.005 mole of molybdenum pentachloride. The resulting reaction mixture was stirred for two hours. The reaction mixture containing a dark precipitate was then charged under nitrogen into a stainless steel shaker tube and 50 grams of propylene was added. The nitrogen was removed and the reaction mixture was heated for one hour at 100° C. and for another hour at 250° C. under continuous agitation. A small quantity of solid polypropylene was isolated from the reaction mixture.

Example X

Under a blanket of nitrogen, there was added to 100 cc. of xylene 4.94 g. (0.0181 mole) of molybdenum pentachloride and 0.686 g. (0.0181 mole) of lithium aluminum hydride. The mixture was stirred and refluxed for 80 minutes.

The above mixture was introduced into a 400 cc. pressure reactor under a blanket of nitrogen. The charged reactor was cooled in a solid carbon dioxide bath, evacuated and pressured with ethylene to 375 lb./sq.in. The temperature and ethylene pressure were then raised progressively as follows:

| Duration of Heating (hrs.) | Temp., °C. | Pressure (lb./sq. in.) | Approximate Total Ethylene Absorption (lb./sq. in.) |
| --- | --- | --- | --- |
| 0 | −10 | 375 | |
| 1 | 121 | 500 | 130 |
| 2.5 | 162 | 550 | 405 |
| 5.5 | 180 | 1,300 | 505 |
| 10.5 | 180 | 1,500 | 930 |
| 16.5 | 180 | 1,410 | 1,020 |

Material removed from the shaker tube after cooling weighed 138.4 g. and consisted of an easily crumbled mass of polymer. The mass was comminuted with methanol in a Waring Blendor and liquid was separated by filtration. Little methanol-insoluble oily polymer was observed. The partially dried filter cake weighed 97 g. A 5-g. aliquot of the filter cake was extracted with boiling benzene, and dissolved polymer (0.03 g.) was reprecipitated by dilution with methanol. Polyethylene not removed by the benzene was then extracted with boiling xylene and reprecipitated with methanol. This gave 1.17 g. of polyethylene with an inherent viscosity of 2.36 (0.1% by weight solution in tetrahydronaphthalene at 125° C.). The total yield of benzene-soluble polymer caculates to have been 0.58 g. with a yield of 22.7 g. of xylene-soluble polymer. The xylene extracted polymer was formed into a film using a Carver press at 200° C. and 4000 lb./sq. in. pressure. The film exhibited an elongation of 25–122%, a tensile strength of 2756–2969 lb./sq. in., and a stiffness modulus (Olson tester) of 42,641–77,337 lb./sq. in.

Example XI

A 400-ml. silver-lined pressure reactor was flushed with nitrogen and charged with 5.19 g. of molybdenum pentachloride, 2.2 g. of commercial powdered titanium hydride and 100 ml. of xylene. The reactor was cooled in a solid carbon dioxide bath, evacuated and pressured with ethylene. The reactor was agitated by means of a reciprocating rack and heated electrically. The temperature was maintained at 100° C. and the pressure at 2500 lb./sq. in for 18 hours. During this period the pressure drop amounted to 4435 lb./sq. in. The reactor was then cooled and the contents discharged and filtered to remove solid polymer. Low molecular weight solid polyethylene weighed 10.8 g. A small portion of this was purified by extraction with boiling xylene. The polymer was precipitated from xylene solution by methanol dilution. The extracted portion of polymer had an inherent viscosity of 3.36.

Example XII

Example XI was repeated, except that the reactor was charged with 5.16 g. of molybdenum pentachloride, 6.13 g. of titanium hydride and 100 ml. of cyclohexane. The temperature of the reaction mixture was maintained at 148–151° C. for 19 hours and the ethylene pressure at 3500 lb./sq. in. Polymer was recovered from the reactor as a solid mass which was washed with methanol in a Waring Blendor and then submitted to successive benzene xylene extractions. From the benzene extract, there was obtained by methanol dilution 2.6 g. of waxy solid polymer. High molecular weight solid polyethylene (14.4 g.) was obtained by diluting the xylene extracts with methanol.

Example XIII

Example XI was repeated, except that the reactor was charged with 6.19 g. of molybdenum pentachloride, 2.5 g. of commercial zirconium hydride powder and 100 ml. of cyclohexane. The reactor was pressured with ethylene and heated to 150° C. for 18 hours. Ethylene pressure was maintained at 3500 lb./sq. in. by periodic repressuring. The solid polymer recovered from the reactor was cut into small pieces and extracted continuously, with boiling benzene, followed by boiling xylene. No polymer was obtained by benzene extraction indicating the lack of a low molecular weight fraction. From the xylene extract there was obtained by methanol dilution 3.6 g. of high molecular weight solid polyethylene. In addition there was a residue of 14.0 g. of insoluble polymer.

Example XIV

Example XI was repeated, except that the reactor was charged with 3.17 g. of molybdenum pentachloride, 1.0 g. of commercial zirconium hydride, and 100 ml. of xylene. The reaction was carried out for 18.5 hours at 148–152° C. and an ethylene pressure of 3500 lb./sq. in. The reaction mixture was filtered to separate the solid polymer. There was obtained as the sole product 9.2 g. of high molecular weight, tough, polyethylene.

It is to be observed that the foregoing examples are illustrative only, and that numerous embodiments of the invention will occur to those who are skilled in the art.

Molybdenum pentaethoxide as employed in the examples hereinabove was prepared by the following procedure: Molybdenum pentachloride (41.1 g.) was dissolved in cooled, pre-dried anhydrous ethanol (436 cc.) and 388 cc. of a 1.94 molar solution of sodium ethoxide in pre-dried ethanol was added with cooling and stirring. Sodium chloride precipitated and was separated by filtration and washed with ethanol. The filtrate and the washings were evaporated under reduced pressure at 25° C. The residue was extracted with 293 cc. of pre-dried benzene. A yellow solid weighing 16.5 g. and a brown solution were obtained. The yellow solid was identified as $NaMo(OC_2H_5)_6$. The benzene solution was evaporated and 28.4 g. of molybdenum pentaethoxide, a dark brown oil, was obtained.

The quantity of catalyst can be varied over a rather wide range. It is desirable to employ a quantity of catalyst which is at least large enough to produce a reasonably rapid rate for a reasonably long period of time. Suitably, the preferred quantity is within the range of 0.001% to 10% based on the weight of molybdenum per unit weight monomer. The ratio of the catalyst components, e.g. the ratio of the reducing agent to the molybdenum compound, may be varied over a large scale and no definite limits of the ratios capable of forming the active catalyst have been established. Preferred molar ratios of the reducing component to the molybdenum component vary from 0.3 to 10.

The polymers which are made under the conditions hereinabove described frequently have such high molecular weights that removal of catalyst by dissolving and filtering is extremely difficult. An effective procedure for obtaining the polymer in a clean form is to wash with methanol, acetone-hydrochloride acid mixtures in a Waring Blendor several times followed by washing with acetone and thereafter, if necessary, followed by several acetone-aqueous sodium hydroxide washes and finally by acetone-water wash. The products thus obtained are generally white. While this procedure is highly satisfactory for preparing clean polymers, it is to be understood that simpler procedures such as washing with the reaction medium, or treatment with water at elevated temperatures, will be entirely suitable for various practical applications. For some applications it may not be essential to remove traces of catalyst.

The activity of the novel catalyst described hereinabove is of such a nature that the catalyst is well suited for polymerization of ethylenically-unsaturated hydrocarbon monomers other than ethylene, suitable examples of other polymerizable olefinic compounds being propylene, butadiene, styrene, cycloalkenes, etc.

The structure of the polyethylene made in accordance with the process of this invention evidently is characterized by being a straight-chain hydrocarbon with vinyl groups at one or both ends of at least some of the molecules. The infra-red measurements indicate very little methyl substitution and a very small number of vinylidine groups, with little or no transunsaturation or carbonyl groups.

The ethylene polymers obtained in accordance with the process of this invention are highly valuable in numerous applications, especially in the form of films, molded articles, extruded insulation on wire, etc.

We claim:
1. A catalyst composition consisting essentially of the product formed by contacting a pentavalent molybdenum compound in which molybdenum is combined with radicals selected from the group consisting of lower alkoxides and halides, with a reducing agent consisting essentially of a metal hydride, said reducing agent being employed in a molar ratio to said molybdenum compound varying from 0.3 to 10.
2. The composition of claim 1 wherein the molybdenum compound is molybdenum pentachloride.
3. The composition of claim 1 wherein the molybdenum compound is molybdenum acetylacetonate.
4. The composition of claim 1 wherein the metal hydride is calcium hydride.
5. The composition of claim 1 wherein the metal hydride is lithium aluminum hydride.
6. The composition of claim 1 wherein the metal hydride is titanium hydride.
7. The composition of claim 1 wherein the metal hydride is zirconium hydride.

References Cited in the file of this patent

UNITED STATES PATENTS

| | | |
|---|---|---|
| 2,287,244 | Heinman | June 23, 1942 |
| 2,367,263 | Truehart | Jan. 16, 1945 |
| 2,406,869 | Upham | Sept. 3, 1946 |
| 2,440,498 | Young et al. | Apr. 27, 1948 |
| 2,524,771 | Darling | Oct. 10, 1950 |
| 2,725,374 | Mosher | Nov. 29, 1955 |
| 2,727,024 | Field | Dec. 13, 1955 |
| 2,822,357 | Brebner | Feb. 4, 1958 |
| 2,843,577 | Friedlander | July 15, 1958 |
| 2,850,488 | Baxter et al. | Sept. 2, 1958 |
| 2,900,372 | Gresham et al. | Aug. 18, 1959 |

FOREIGN PATENTS

| | | |
|---|---|---|
| 533,362 | Belgium | May 16, 1955 |
| 534,792 | Belgium | Jan. 31, 1955 |
| 534,888 | Belgium | Jan. 31, 1955 |
| 538,782 | Belgium | Dec. 6, 1955 |

OTHER REFERENCES

Journal Org. Chem., vol. 10 (November 1945), pp. 505–515, entitled, "Organometallic Compounds of Titanium, Zirconium and Lanthanum," by H. Gilman and R. G. Jones.

UNITED STATES PATENT OFFICE
CERTIFICATE OF CORRECTION

Patent No. 3,038,863            June 12, 1962

Joseph Hendrickson Balthis, Jr., et al.

It is hereby certified that error appears in the above numbered patent requiring correction and that the said Letters Patent should read as corrected below.

Column 7, line 33, for "acetone-hydrochloride" read -- acetone-hydrochloric --.

Signed and sealed this 25th day of September 1962.

(SEAL)
Attest:

ERNEST W. SWIDER
Attesting Officer

DAVID L. LADD
Commissioner of Patents